US010981316B2

(12) United States Patent
Hoeglinger (10) Patent No.: US 10,981,316 B2
(45) Date of Patent: Apr. 20, 2021

(54) CONTROL DEVICE FOR A HANDLING DEVICE

(71) Applicant: ENGEL AUSTRIA GmbH, Schwertberg (AT)

(72) Inventor: Wolfgang Hoeglinger, Hoersching (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 507 days.

(21) Appl. No.: 15/785,491

(22) Filed: Oct. 17, 2017

(65) Prior Publication Data

US 2018/0104875 A1 Apr. 19, 2018

(30) Foreign Application Priority Data

Oct. 18, 2016 (AT) ................ A 50940/2016

(51) Int. Cl.
*B29C 45/80* (2006.01)
*B29C 45/42* (2006.01)
(Continued)

(52) U.S. Cl.
CPC .............. *B29C 45/80* (2013.01); *B29C 45/04* (2013.01); *B29C 45/1756* (2013.01);
(Continued)

(58) Field of Classification Search
CPC ......... B29C 45/80; B29C 45/42; B29C 45/04; B29C 45/1756; B29C 45/14008;
(Continued)

(56) References Cited

U.S. PATENT DOCUMENTS 4,285,649 A 8/1981 Jonte et al.
5,629,031 A 5/1997 Ishikawa et al.
(Continued)

FOREIGN PATENT DOCUMENTS

CN 2524906 12/2002
CN 101758607 6/2010
(Continued)

OTHER PUBLICATIONS

Search Report dated Apr. 28, 2019 in Chinese Patent Application No. 2017109718603, with partial English-language translation.
(Continued)

*Primary Examiner* — Joseph S Del Sole
*Assistant Examiner* — Jamel M Nelson
(74) *Attorney, Agent, or Firm* — Wenderoth, Lind & Ponack, L.L.P.

(57) ABSTRACT

A control device for a handling device includes a storage medium, a processing unit, an output for outputting signals, and an input for receiving signals from the handling device. A waiting phase is conducted before an actuation of an end-of-arm tool mounted to an end-of-arm of a handling arm. The signals received by the input represent a dynamic parameter of the end-of-arm and a threshold value corresponds to a specific dynamic parameter of the end-of-arm stored in the storage medium. The signals received by the input can be compared with the threshold value by a comparison unit of the control device, and an end of the waiting phase can be determined when reaching the threshold value. Depending on a curve of the dynamic parameter, the threshold value can be determined and the end of the waiting phase can be determined when reaching the threshold value.

16 Claims, 6 Drawing Sheets

(51) Int. Cl.
B29C 45/04 (2006.01)
B29C 45/17 (2006.01)
B29C 45/14 (2006.01)

(52) U.S. Cl.
CPC ........ *B29C 45/42* (2013.01); *B29C 45/14008* (2013.01); *B29C 2945/76117* (2013.01); *B29C 2945/76568* (2013.01); *B29C 2945/76795* (2013.01)

(58) Field of Classification Search
CPC ........... B29C 45/76; B29C 2945/76117; B29C 2945/76568; B29C 2945/76795; B29C 2045/4241; B29C 64/379; B29C 64/386; B25J 9/1633; B22D 17/20; B33Y 10/00; B33Y 30/00; B33Y 50/00; B33Y 50/02
See application file for complete search history.

(56) References Cited

U.S. PATENT DOCUMENTS

| | | | |
|---|---|---|---|
| 6,532,397 | B1 | 3/2003 | Yamamoto |
| 8,886,359 | B2 | 11/2014 | Inaba et al. |
| 9,199,375 | B2 | 12/2015 | Miyoshi |
| 9,387,614 | B2 | 7/2016 | Kalender et al. |
| 2004/0025592 | A1 | 2/2004 | Thomas et al. |
| 2008/0031992 | A1 | 2/2008 | Matsuo et al. |
| 2012/0296471 | A1* | 11/2012 | Inaba ........................ B25J 9/163 700/253 |
| 2013/0041503 | A1 | 2/2013 | Kalender et al. |

FOREIGN PATENT DOCUMENTS

| | | |
|---|---|---|
| CN | 103513575 | 1/2014 |
| CN | 105729739 | 7/2016 |
| DE | 10 2009 040 434 | 5/2010 |
| DE | 10 2012 104 194 | 11/2012 |
| EP | 0 985 989 | 3/2000 |
| EP | 1 057 607 | 12/2000 |
| EP | 1 920 892 | 5/2008 |
| EP | 2 560 802 | 2/2013 |
| EP | 2 617 535 | 7/2013 |
| JP | 11-7313 | 1/1999 |
| JP | 2015-168250 | 9/2015 |
| WO | 03/089214 | 10/2003 |

OTHER PUBLICATIONS

Search Report dated Aug. 22, 2017 in Austrian Application No. A 50940/2016, with English translation.

* cited by examiner

CONTROL DEVICE FOR A HANDLING DEVICE

BACKGROUND OF THE INVENTION

1. Field of the Invention

The invention concerns a control device for a handling device, comprising a storage medium, a processing unit, an output for outputting signals and an input for receiving signals from the handling device, wherein the end of a waiting phase can be determined by the control device when reaching a threshold value, wherein the waiting phase is conducted before an actuation of an end-of-arm tool mounted to an end of arm of a handling arm and serves for decaying oscillations of the end-of-arm of the handling arm of the handling device. The invention further concerns a handling device for a molding machine, comprising a handling arm which has an end of arm, an end-of-arm tool mounted to the handling arm for handling a molding part or a semi-finished product, at least one drive device for the handling arm and such a control device. In addition, the invention concerns a molding unit comprising a molding machine and such a handling device.

2. Description of the Related Art

Since many decades in the field of the automation engineering, miscellaneous kinds of machines have already been used for moving objects from one location to another during the production of an item. For this purpose, robots or so-called handling devices are frequently used. In many cases, these handling devices are fixedly anchored to a certain position of the production hall and comprise at least one handling arm with which spatial movements can be performed. For that purpose, the handling device usually includes several linear (typically denoted with X, Y and Z) and/or rotational movement axes (typically denoted with A, B and C). A particular section of the handling arm is the end of the arm (thus the end of the linear XYZ axes) which is specified in the following as end-of-arm. In some cases, also the term end-of-ABC is being used, in which case the end of the rotary axes (ABC) following the end-of-arm is meant. Mostly, a manipulator or a transfer head (in the following referred to as end-of-arm tool) is arranged on this end-of-arm. This end-of-arm tool includes manipulating elements (e.g., grippers, suction devices, magnets, etc.) adapted to the items to be moved or adapted to the process to be executed. In processes to be executed, a particular relevance has the position and/or the orientation of the tip of the transfer head/tool which is referred to as tool-center-point (TCP). Simple embodiments of handling devices only have linear axes or pneumatic rotary axes which typically can assume only two positions predefined by the end positions of the pneumatic actuators. There are also mixed variants with pneumatic servo-motorized rotary axes—in the case of such simple handling devices often the end-of-arm is also referred to as TCP, knowing that the gripper position deviates therefrom. In the following, an exact distinction between end-of-arm, end-of-ABC and tool-center-point is omitted and the term end-of-arm is used as a synonym.

Not only in the case of the production of molding parts in molding machines, for example injection molding machines or transfer molding, the speed of the movements performed by the handling device should be as high as possible in order to reach a production time per produced item as short as possible. However, the faster the movements of the handling arm and the longer the handling arms protrude (or the longer the path covered by the end-of-arm), the greater the oscillation movements of the end-of-arm in the case of a strong braking action when reaching the object to be handled or when reaching the place of the process to be executed.

For this reason, there have already been miscellaneous efforts to positively influence or to optimize this oscillation behavior. To this end, reference can be made, for example to DE 10 2009 040 434 A1 which shows a handling part for an injection molding machine with active damping. More specifically, it concerns to allow an exact and fast positioning and, thus, a short cycle time, at the same time, thereby minimizing the oscillations of the handling device. By considering the elastic properties of at least one moveable component of the handling device—by describing this elastic behavior at least approximately by means of a mathematical model and by a modification or a generation of the predetermined path according to this model—the elastic or dynamic deviations of the position of the end piece are reduced from the originally determined predetermined position and the initiated oscillations are avoided or at least reduced. In other words, by a targeted influence on the predetermined path, it is tried to reduce the occurring oscillation.

In a similar manner, also the EP 1 920 892 B1 shows a robot control device, wherein dynamic characteristics of the robot and a component are taken into consideration. For this purpose, a first part model and a second part model are created. In particular, there are modeled spring-damper elements which are each associated to one of the part models. The aim is that the robot and the components mounted to the robot are set to vibrate by an impact and that the oscillation is monitored by measurement. While doing so, the oscillation process is modeled. Therefrom, again, a signal is determined which corresponds to the angle of this axis during oscillation in particular as a function of the time for discrete points in time. The oscillation frequency and the resulting rigidity of the whole system are determined by minimizing the error. Mentioned are measuring devices, for example, accelerations sensors at the flange of the robot or a camera system which observes the so-called tool-center-point (TCP) of the robot. Alternatively, the oscillation process can also be observed by the position sensor arranged on the electric drive or by an analysis of the electric current of the drive. This oscillation process then results in a signal as a function of time at discrete points in time. Thus, the oscillations are indeed observed, however, no direct influence of the robot operation for the reduction of the production time derives therefrom.

The problem of the cycle time reduction is indeed addressed in the EP 2 560 802 B1; however, this document is not about the oscillation behavior of a handling arm. Rather, it is about to recognize the position of the molding tool when withdrawing molding articles from an injection molding machine with an automatic handling machine. The motion sequence of the robot specified by means of the open- and closed-loop control unit is recalculated after each removal cycle on the dependence of an edge of the signal. In particular, the automatic handling machine is moved from its starting position for the next removal cycle by means of a timer based on the recalculated start time. The overall goal of this invention is to reduce the time from the positive edge of the mold open signal until the removal position is reached. Thus, a reduction of the overall time for a production cycle is made possible, whereby an increase in the productivity is reached.

The above-mentioned documents mainly serve for the explanation of already known ideas for the topics regarding the improvement of the oscillation behavior and reduction of the cycle time. All of these documents, however, do not show generic control devices. Such a control device as described herein enables that the oscillation behavior of the end-of-arm does not have an adverse effect on the manipulation of the object to be handled. If, namely, the oscillation has not sufficiently subsided, the end-of-arm and the end-of-arm tool are not located on the actually planned position, whereby the object (molding part or semi-finished product) is being gripped wrongly or, in the worst case, the molding part, the semi-finished product, the molding tool or the handling device is being damaged. In order to prevent this case, a threshold value in form of a time limit is predetermined in the storage medium. This threshold value has empirically been determined and indicates at which point of time, after reaching the position for the handling, when the actual handling is allowed to be effectively started. For setting this threshold value, it has empirically been determined in tests how long it takes until the oscillation is sufficiently subsided. This time limit is then chosen sufficiently large, so that also an unexpected longer oscillation does not have an adverse effect. Because of that, also a certain additional buffer is included in this fixedly predetermined threshold value. For example, the time limit of the threshold value can be between 0.3 and 2 seconds.

A drawback with this generic control device is that the waiting time can lead to an unnecessary long time, although the effective oscillation would have actually subsided sufficiently. Thus, precious cycle time is being wasted. Even if the threshold value of the waiting time is too long for only 0.1 second per cycle, 600 cycles would lead to 1 minute of unnecessary waiting time.

SUMMARY OF THE INVENTION

The object of the present invention therefore is to provide an improved control device and an improved handling device and to prevent the mentioned disadvantages of the generic prior art. In particular, wasting cycle time by waiting shall be prevented.

Thus, a first variant according to the invention provides that the signals received by means of the input represent a dynamic parameter of the end-of-arm of the handling arm, and the threshold value corresponds to a specific dynamic parameter of end of arm stored in the storage medium, wherein the received signals can be compared with the threshold value by means of a comparison unit and the end of the waiting phase can be determined when reaching the threshold value. Therefore, no fixedly predetermined time threshold value is being used for the end of the waiting period or for the starting point for the continuation, but rather a current signal, which describes the oscillation behavior of the end of arm in the form of a dynamic parameter, is compared with a corresponding threshold value. This threshold value, thus, is not formed by a time value, but rather by a value representing the oscillation. This value is chosen in such a way that an adverse effect for the immediately following handling is virtually excluded. This value is for example chosen in such a way that the value is at 5% of the maximal oscillation at the point in time when reaching the handling position. This means that there is only a slight vibration which, however, cannot substantially adversely affect the handling. The more sensitive the part to be handled, the smaller of course this threshold value representing a dynamic parameter. As soon as the signal of the currently present dynamic parameter received by means of the input reaches the threshold value or exceeds the threshold value in a predetermined direction, the end of the waiting period is reached.

A second and alternative variant according to the invention thus provides that multiple oscillating profiles of the end-of-arm, each with a curve of a dynamic parameter of the end-of-arm, are stored in the storage medium, wherein in dependence on the curve of the, preferably calculated, dynamic parameter the threshold value, which corresponds to a time limit, can be determined and the end of the waiting phase can be determined when reaching the threshold value. In the case of this variant, thus, the current dynamic value is not considered, but rather a modeling of the oscillation behavior is initially carried out on the basis of known values of the end-of-arm like motion speed, motion path, braking behavior, weight of the involved components, deflection, stress state, etc. On the basis of this modeled oscillation behavior, the threshold value in the form of a time limit is determined. Thus, no empiric determining of the time threshold value is carried out, but rather a calculation on the basis of actual parameters of the handling arm is carried out. Also this leads to a reduction of the cycle time as the time threshold value can be placed very near to a sufficiently low oscillation value of the curve of the dynamic parameter.

In principle, the handling device or a control of the handling device can autonomously read out or retrieve the determined end of the waiting period from the control device. According to a preferred embodiment, however, it is provided that a continuation signal can be outputted by the control device in dependence on the determined end of the waiting phase. The end of the waiting period can be stored for example in the form of threshold value adjustable by an installer.

Generally, it is preferably provided that the dynamic parameter is an oscillation value which is determined, preferably measured or calculated, on the basis of the speed, the acceleration, the deflection, the stress state, and/or the position of the end-of-arm. In this context "dynamic" means that the actual time profile of the oscillation movement—thus the dynamic of the end-of-arm—is recognized in this dynamic parameter. The determination, preferably the measuring, of the oscillation value is carried out on at least one predetermined position of the handling arm including the end-of-arm tool. This determination allows a conclusion on the dynamic of the end-of-arm, end of ABC or end-of-arm tool.

The dynamic value used in the first variant concretely can be a value which is expressed as g-force (force per mass) or as acceleration (m/s$^2$). The threshold value is then, for example, indicated as a percentage of a g-force or of an acceleration maximally occurring during the oscillation. Preferably, the dynamic threshold value is between 0.5 and 10%, particularly preferred between 1.5 and 7%, of the g-force or of the acceleration given at the maximal oscillation.

The curve used in the case of the second variant can be gathered in a test run of the handling arm or in several test runs with different weights and speeds. Preferably, however, it is provided that the curve of the dynamic parameter is determined or calculated by a calculating unit on the basis of known values or the handling device. Also a mixed variant is possible, in the case of which in dependence on at least one test run and additional calculations the course of the dynamic parameter is determined by means of the calculation unit.

Protection is also sought for a handling device. This handling device comprises a handling arm, an end or arm tool, a drive device for the handling arm, and a control device according to the invention.

In this case, the control device can be formed as a separate structural unit and can be signally connected to the substantial components of the handling device, so that the control device can directly regulate or control the movement of the handling device. Thus, the continuation signal can be directly outputted by the control device to the at least one drive device of the handling arm. Preferably, however, it is provided that the handling device comprises a handling control system, wherein the control device is signally connected to the handling control system or is integrated into the handling control system. In this case, therefore, the continuation signal is indirectly outputted via the handling control system to the at least one drive device. However, it can also be provided that the control device is integrated into the handling control system. This control device thus can be retrofitted as an additional program in an already existing handling control device.

Generally, the control device is preferably a closed loop control device. The handling control system can be an open loop or a closed loop control system.

According to a preferred embodiment it is provided that at least one procedure sequence for the movement of the end-of-arm along at least one movement axis is stored in the storage medium of the control device or in the handling control system. In particular, the corresponding drive device of the single movement axes of the handling device can be controlled on the basis of this procedure sequence in such a way that the end-of-arm is moved along a determined target path with determined speeds.

In detail, it is preferably provided that the at least one procedure sequence comprises a period of movement for moving the end-of-arm from a starting position to a handling position, the waiting phase, a handling phase initiated by the continuation signal and a movement or transport phase for the moving the end-of-arm from the handling position into an end position. Of course, depending on the utilization and complexity, there can also be additional periods.

If the handling device shall not only be used for a consistent movement sequence and one or multiple procedure sequences stored in the storage medium of the control device or in the handling control system are different from each other for example at least in the speeds of the end-of-arm in the period of movement by using an additional speed default (override), it is preferably provided that for each procedure sequence a threshold value is stored in the storage medium, this threshold value being independent from the respective speed of the end-of-arm in the movement phase. Therefore, the necessary time requirement can be different depending on the braking velocity. If the handling device shall not be used for a consistent handling task, it is preferably provided to store several procedure sequences with at least different handling phases, wherein for each handling phase a separate threshold value is stored. This threshold value does not have to be in the range of 5% of the maximal oscillation, but rather can also be only 2% or lower in the case of a handling phase with a process which is very demanding regarding the precision and thus with a very low predetermined maximal oscillation. Preferably provided is also the central determination of several threshold values, which are associated to different handling tasks like taking (accommodating), depositing, inserting of semi-finished products of molding parts or to machining processes, and the use of the threshold values according to the action chosen in procedure sequence in the handling phase.

According to a preferred embodiment, it is provided that at least one sensor is provided which can be signally connected to the control device, wherein the values measured by the sensor can be transmitted to the input of the control device as signals representing the dynamic parameter. This at least one sensor can be formed as an acceleration sensor, preferably as a three-axis acceleration sensor. The acceleration sensor can also be formed redundant in order to absolutely detect the position of the end-of-arm. The sensor can also be formed as an optical sensor (e.g., as a camera directed to a reference position, as a stereo camera, as a distance sensor, etc.), with which the position of the end-of-arm is detected relative to the surrounding. Also the use of a strain gauge, a position sensor, a sensor based on a vacuum measuring, a load cell or a radio sensor is possible. For the positioning of the sensor it is theoretically possible that this sensor can be transported together with the part which is transported by the handling device. The at least on sensor can be arranged in a base area of the handling device or generally on the molding machine. For example, the sensor can be formed as a camera and can "look" onto the end-of-arm. Thereby, relative movements to a fix background can be detected. Preferably, however, it is provided that the at least one sensor is arranged in the area of the end-of-arm. As a consequence, the oscillation can directly be detected where it occurs.

Also for the second variant according to the invention, values can be used for the calculation, which values derive from at least one such sensor. In the case of this model-based approach, it is possible though that by means of other sensors (for example with the already existing drives) the curve of the dynamic parameter (procedure sequence) is calculated.

In principle, it is possible that the control device is only responsible for the determination of the end of the waiting phase and optionally for the appropriate outputting of the continuation signal. Preferably, however, also the task is covered that in each phase of the procedure sequence corresponding signals can be transmitted by the control device via the output to the at least one drive device.

The time until the end of the waiting phase can be used for a statistical evaluation. For example, the minimal, the maximal, and the average occurred waiting time can be determined. In addition, the variable waiting time can also be used for the decrease/increase of a velocity override or for the visualization of the condition of the handling device for the next cycle.

A further statistical evaluation of the waiting time preferably is the evaluation of all waiting times during one or multiple procedure sequences, which waiting times the robot has to wait till the handling receives the continuation signal from the control device. This statistic value—whether as sum, average or other statistical function—which is evaluated for a production cycle or for the cycle time illustrates a process quality feature for the production of a finalized part by the molding machine and can be recorded for the continuous production duration of a product or also for the production of different items, can be illustrated on the production unit or offline on an evaluation unit (e.g., on a personal computer etc.) and can be evaluated for the purpose of a machine diagnose and a condition monitoring.

Protection is also sought for a molding unit with a molding machine, in particular an injection molding machine or an injection press, and a handling device together with a control device according to the invention.

In this respect, it is preferably provided that the molding machine comprises an injection unit and a closing unit with a molding tool, wherein by the handling device a semi-finished product can be brought into the molding tool or a molding part produced in the molding tool can be handled—preferably accommodated, deposited, delivered and/or inserted—in the handling phase.

This molding machine comprises a machine control system, wherein the control device can also be directly signally connected to this machine control system. Preferably, it is provided that the handling control system is signally connected to the machine control system or is integrated into the machine control system.

In the case of the method according to the invention for controlling the handling device, initially the step comparing signals of the handling device received via the input (optionally after a further processing like filtering, statistic evaluation, etc. of the signal), which signals represent a dynamic parameter of the end-of-arm of the handling arm, with a threshold value stored in a storage medium, which threshold value corresponds to a specific dynamic parameter of the end-of-arm, is provided in case of the first variant.

In case of the second variant initially the steps determining, preferably calculating, of curves of a dynamic parameter of the end-of-arm, storing of multiple oscillating profiles of the end-of-arm on the basis of the determined curves and determining a threshold value corresponding to a time limit for each oscillating profile in dependence on each curve of the dynamic parameter of the end-of-arm are provided.

Afterwards, the step determining the end of a waiting phase when reaching the threshold value is carried out, wherein the waiting phase is conducted before an actuation of an end-of-arm tool mounted to an end-of-arm of a handling arm and serves for the subsiding of oscillations of the end-of-arm of the handling arm of the handling device. Preferably, the step outputting a continuation signal via the output can be carried out in dependence on this predetermined end of the waiting phase, wherein the continuation signal represents the termination of a waiting phase for the subsiding of oscillation of an end-of-arm of a handling arm of the handling device. In an extreme case the waiting phase can also be omitted or can become 0, as long as the continuation signal can already be outputted to the point in time at the beginning of the waiting phase. This implies that the criteria for the outputting of the continuation signal is already verified or calculated before the beginning of the waiting phase.

In the case of a method for moving a handling arm of a handling device on the basis of a procedure sequence, the following steps are provided: Moving an end-of-arm of the handling arm from a starting position to a handling position, waiting according to a waiting phase of the procedure sequence, terminating the waiting phase in dependence on an end of the waiting phase determined by a method described herein, preferably by outputting a continuation signal, handling a molding part or a semi-finished product with an end-of-arm tool mounted to the handling arm and moving the end-of-arm into an end position.

BRIEF DESCRIPTION OF THE DRAWINGS

Further details and advantages of the present invention are described more fully hereinafter by means of the specific description with reference to the embodiments illustrated in the drawings, in which.

DETAILED DESCRIPTION OF THE INVENTION

Figure 1:
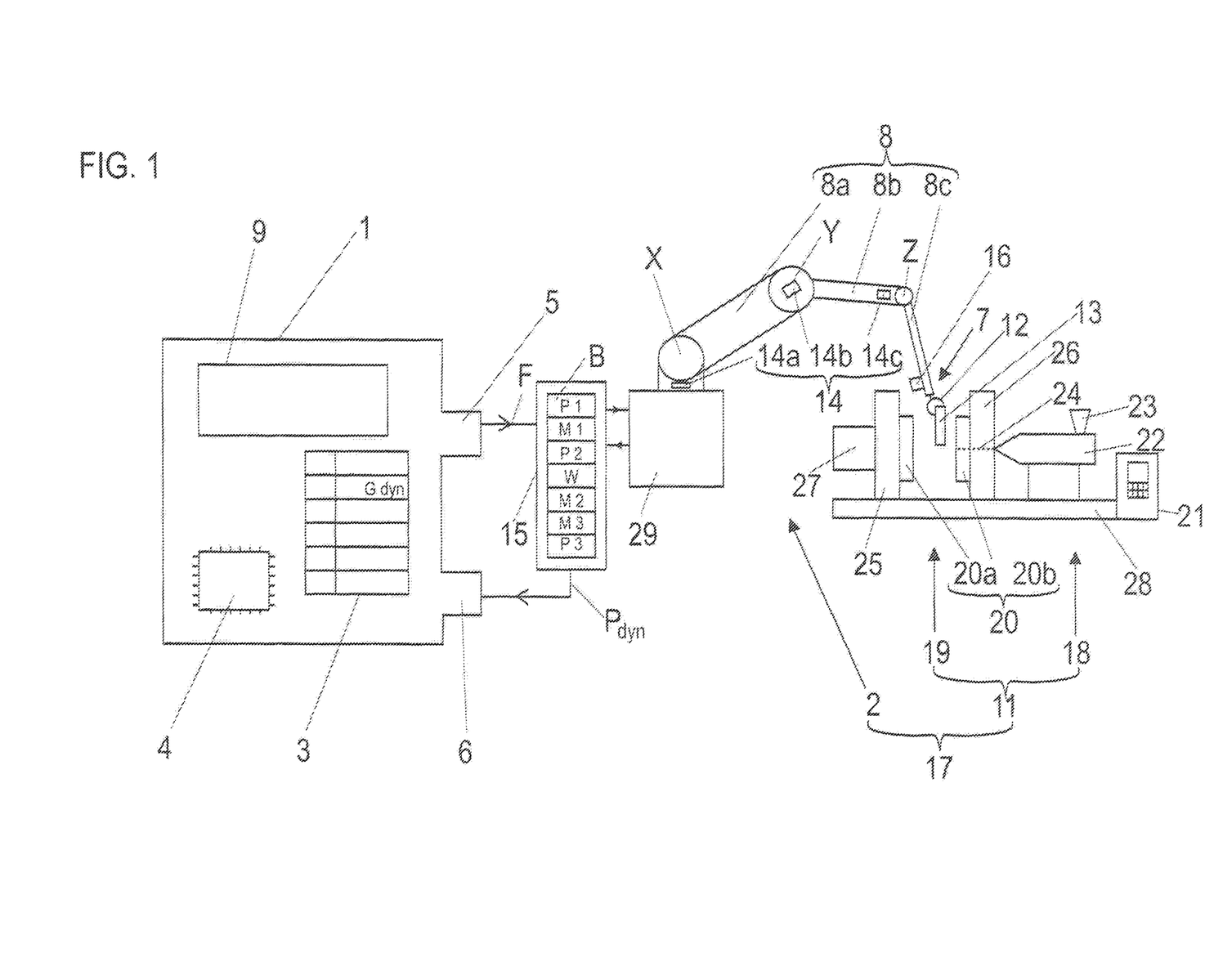
FIG. 1 shows schematically a molding unit with a control device, a handling device and a molding machine.

FIG. 1 schematically shows on the right side a molding unit 17. This molding unit 17 comprises a molding machine 11 and a handling device 2. In turn, the molding machine 11 comprises a closing unit 19 and an injection device 18. Also a machine control system 21 with a screen and an input unit (touch screen and/or keyboard) is provided. Starting material, preferably in the form of granulate, is melted in an injection unit 22 of the injection device 18, which starting material is introduced by means of a feed hopper 23. The melt is brought into a cavity formed in the molding tool 20 by means of the dashed illustrated injection channel 24, wherein the molding tool 20 comprises the two mold halves 20a and 20b. The two mold halves 20a and 20b are mounted to the moveable mold mounting plate 25 and to the fix mold mounting plate 26. The moveable mold mounting plate 25 is moveable along the frame 20 by a drive device 27 which is, for example, a toggle lever mechanism.

The handling device 2 comprises a socket 29. The handling device 2 can also be mounted on or at the molding machine 11 by means of this socket 29. In this case, the handling arm 8 comprises three arm parts 8a, 8b and 8c. These arm parts 8a, 8b, 8c are moveable relative to each other along or around the movement axes X, Y and Z. These movement axes X, Y and Z can be formed rotational or linear. Each arm part 8a, 8b and 8c can be driven by a corresponding drive device 14a, 14b, and 14c. These three sub-drive devices form the drive device 14 for the handling arm 8. The handling arm 8 comprises and end piece which is referred to as end-of-arm 7. An end-of-arm tool 12 is mounted at the end of the handling arm 8. This handling arm tool 12 can also be referred to as manipulator or as transfer head. In the shown case, the end-of-arm tool 12 is formed as a pincer-like gripper. A molding part 13 is just removed from the cavity of the molding tool 20 by this gripper. Also, a—preferably fiber-reinforced—semi-finished product (e.g., a preform, a composite laminate or a roving) can of course be inserted into the cavity by this manner. In a handling control system 15 signally connected to the handling device 2, a procedure sequence B for the handling arm 8 of the handling device 2 is stored. Originating from this procedure sequence B, the single drive devices 14a, 14b and 14c are controlled. According to the movement phase M1, the end-of-arm 7 is moved from the starting position P1 into a handling position P2. Then, the waiting phase W follows. As soon as this waiting phase W has ended, the handling phase M2 by means of the end-of-arm tool 12 follows. Finally the transport phase M3 follows. After the procedure sequence B has been travelled, the end-of-arm 7 is in the end position P3. Also a sensor 16 is mounted in the area of the end-of-arm 7. A value is measured by this sensor 16, which value represents a dynamic parameter $P_{dyn}$, e.g., an acceleration signal, of the end-of-arm 7.

A (open-loop) control device 2 signally connected to the handling device 2 is schematically shown on the left side of FIG. 1. This control device 1 can be integrated into the handling control system 15. In the shown case, these structural components are separately formed. The control device 1 comprises a processing unit 4 and a storage medium 3. Further, there is an input 6 for receiving signals and an output 5 for outputting signals. The control device 1 receives a signal originating from the sensor 16 by means of the input 6, which signal represents the dynamic parameter $P_{dyn}$ of the end-of-arm 7. In a comparison unit 9 of the control device 1 this value is—in the case of the first variant according to the invention—compared with the threshold value G stored in the storage medium 3, which threshold value G corresponds to a dynamic threshold value $G_{dyn}$ comparable with the dynamic parameter $P_{dyn}$. As soon as the dynamic parameter $P_{dyn}$ transmitted by the sensor 16 reaches the dynamic threshold value $G_{dyn}$ or exceeds the dynamic threshold value $G_{dyn}$ in a predetermined direction, the end of the waiting phase W is reached. Depending therefrom, a continuation signal F is the outputted. Thereby, the waiting phase W of a procedure sequence B is terminated. The procedure sequence B is preferably stored in the handling control device 15. This continuation signal F can directly be outputted from the control device 1 to the corresponding drive device 14 of the handling device 2. Preferably, it is provided that this is carried out indirectly by transmitting this continuation signal F—as shown—to the handling control device 15, whereby the procedure sequence F can be switched from the waiting phase W to the handling phase M2. In this handling phase M2, a signal is outputted to the end-of-arm tool 12 which correspondingly handles the molding part 13 (or the semi-finished product respectively).

Figure 2:
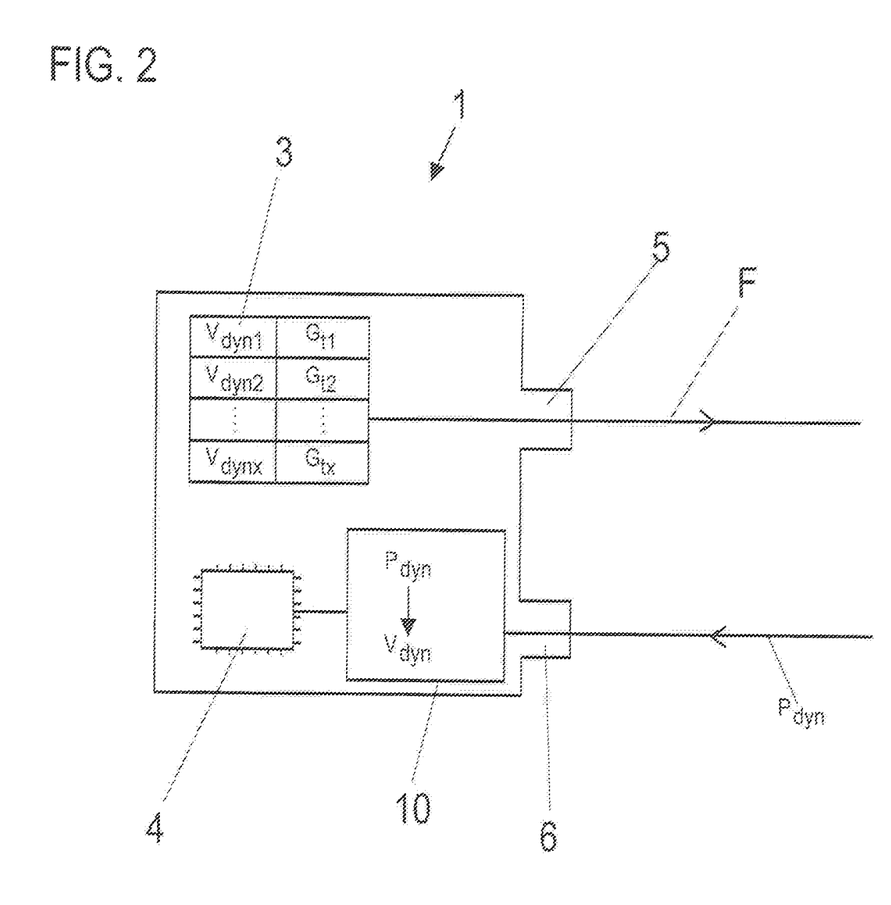
FIG. 2 shows schematically a second variant of the control device according to the invention.

FIG. 2 schematically shows a second variant of the control device 1 according to the invention. The oscillating profiles are calculated in the calculation unit 10 of the control device 1. The oscillating profiles are based on the received dynamic parameters $P_{dyn}$, from which each a curve $V_{dyn}$ of the dynamic parameter $P_{dyn}$ is generated. These calculated curves $V_{dyn1}$ to $V_{dynx}$ are stored in the storage medium 3. For each of the curves $V_{dyn1}$ to $V_{dynx}$ also an associated time threshold value $G_{t1}$ to $G_{tx}$ is determined and stored.

The waiting phase W is terminated by the control device 1, preferably by outputting a continuation signal F, as soon as—during the execution of the procedure sequence B of the handling device 2 in the waiting phase W—the threshold value G stored as a time limit is reached. In this case, it is (automatically or manually) considered which of the stored curves $V_{dyn}$ correspond to the current procedure sequence B and/or to the current characteristics of the handling device 2. Thus, that threshold value $G_t$ is used, which threshold value $G_t$ is stored for that oscillating profile which corresponds to the actual oscillation behavior or which comes nearest to this oscillation behavior. In the case of a curve $V_{dyn}$ with a strong oscillation behavior, thus, a threshold value $G_t$ with a later time limit for the outputting of the continuation signal F will be stored.

Figure 3:
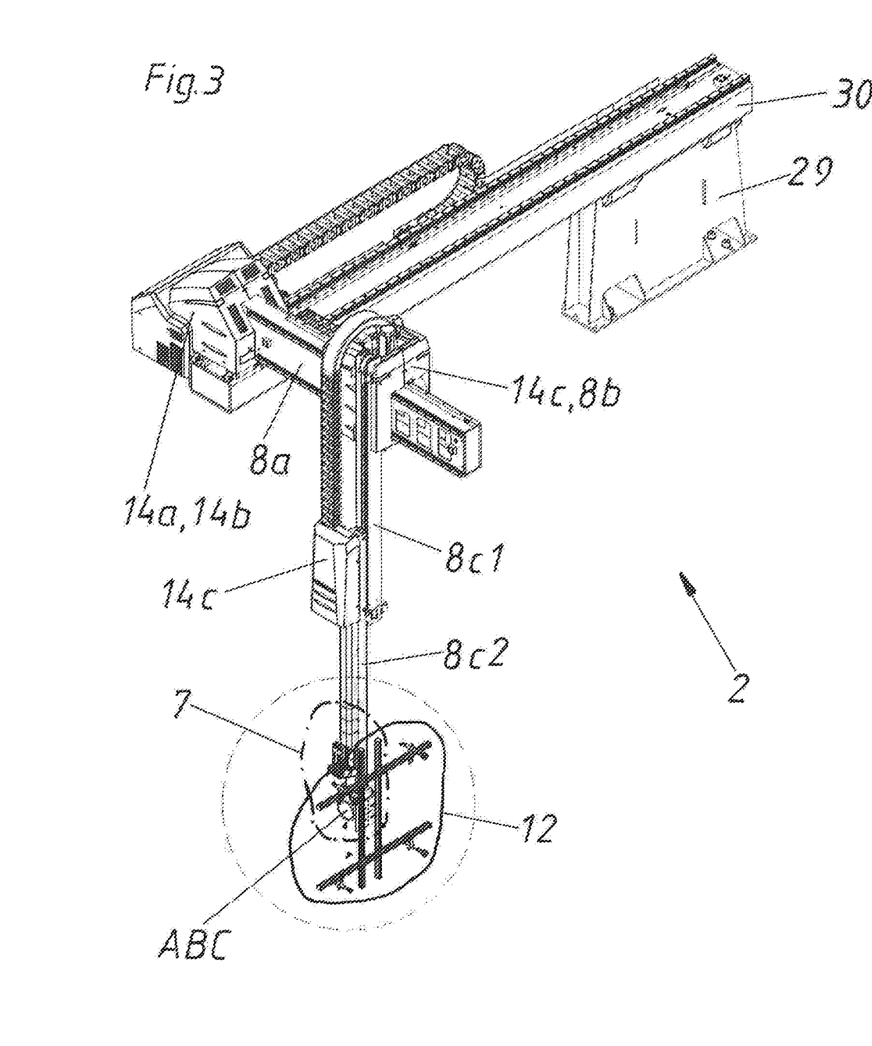
FIG. 3 shows a handling device in a perspective view.

FIG. 3 shows a handling device 2 in a perspective view. An elongated carrier 30 is mounted to the socket 29. The arm part 8a of the handling arm 8 is linearly moveable along this carrier 30 by means of the drive device 14a. The arm part 8b, in turn, is linearly moveable along this arm part 8a by means of the drive device 14b. The arm part 8c, consisting of the parts 8c1 and 8c2, is moveable in vertical direction relative to the arm part 8b. The arm part 8c is driven by the drive device 14c. The end-of-arm tool 12 is mounted to the end piece (end-of-arm 7). In this case the end-of-arm tool 12 is connected by means of a rotary axis ABC to the end-of-arm 7. There can also be several rotary axes ABC.

Figure 4:
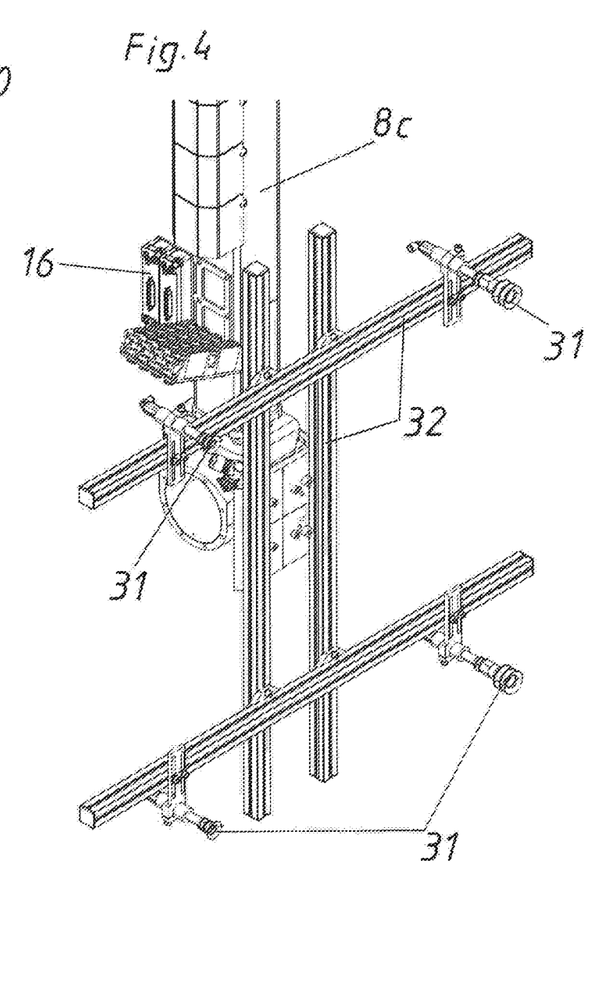
FIG. 4 shows a detail of FIG. 3.

In FIG. 4 the end-of-arm tool 12 is shown in details. This end-of-arm tool 12 comprises four suction elements 31 and four rods 32 by means of which a flat molding part 13 can be held well. A sensor 16 in the form of an acceleration sensor is mounted in the area of the end-of-arm 7. This sensor 16 detects the occurring accelerations on this position and, thus, enables a direct and model-based determination of the acceleration of the end-of-arm tool 12 in the control device 1.

Figure 5:
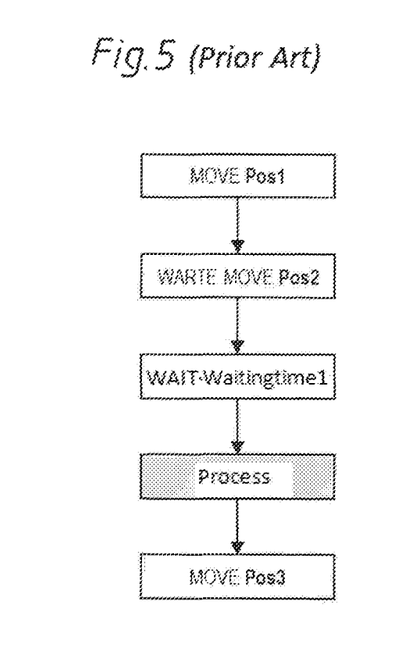
FIG. 5 shows exemplary program code according to the prior art.

Generally, it is so that the positioning of the manipulator (end-of-arm tool 12) is carried out with a high dynamic, so that in particular protruding constructions cause an oscillation action subsequent to a positioning action. The duration of the oscillation action is depending on many parameters like position, weight distribution, position of the handling axes, used dynamic, etc. as well as on the precision requirements of the process. That is why according to the prior art the waiting time for the subsiding/decaying of the residual oscillation is empirically determined and is provided with tolerances in order to reach the desired process safety. In the following, the prior art of a program code of a control device of a handling device during taking or inserting a molding part or a semi-finished product shall be shown with reference to FIG. 5. Typically, an operation in the following form is advisable in this case:

Outputting an instruction for moving to a preparation position (starting position P1) with a high velocity (MOVE Pos1)

Outputting an instruction for moving to the target position (handling position P2) for the handling of parts with a reduced speed and outputting of an instruction for waiting till the default position corresponds to the target position (WAIT MOVE Pos2)

Waiting until the residual oscillation has subsided (WAIT Waitingtime1)

Outputting a control signal for the releasing or receiving of parts with the end-of-arm tool 12 and waiting until the handling is terminated successfully (Process)

Outputting a signal for the movement into the next position, e.g., into the end position P3 (MOVE Pos3)

In particular, in the case of the third instruction step mostly a fix time is used as there is no information about the state of the handling arm concerning the oscillations.

By the use of sensor systems (sensor 16) at the end of the handling arm 8 or in its vicinity, it is possible to detect the state of the handling arm 8 concerning the dynamic (acceleration, velocity, deflection, stress state, vision systems, etc.). If now using one or multiple sorts of dynamic values (or values determined therefrom) as a decision criteria for the passing from the last robot position movement to the triggering of the end-of-arm tool, the yet predetermined time can be omitted. In particular, a parameter in the form of a limit for the decision criteria can be given to the new waiting condition. By the use of a sensor system, thus, a higher process safety is reached on the one hand and also a faster process run is reached on the other hand. Therefore, the new program code with robot instruction could appear as in FIG. 6. Accordingly, the difference to FIG. 5 is only in the third step. According to the third step, it is waited till the residual oscillation falls below a certain limit (threshold value G). In other words, there is a new waiting instruction instead of the empirically determined Waitingtime 1 according to FIG. 5, which waiting instruction waits for the falling below a limit representative for the end point acceleration. In addition, the limit can be chosen in such a way that it corresponds to the requirements of the process and is still valid in the case of changes in the planning of the travel path (position, dynamic) or even in the manipulator, that no damages are caused and that even a reduction of the cycle time is reached.

Figure 7:
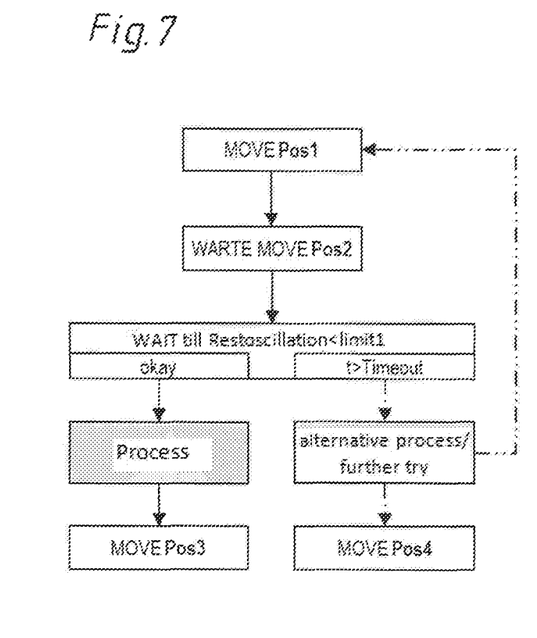
FIG. 7 shows exemplary program code with an additional maximal waiting time.

FIG. 7 exemplarily shows a further program code. In this embodiment the waiting instruction has been complemented by the evaluation of a maximal waiting time (timeout). If the maximal waiting time is expired and the residual oscillation limit is not yet achieved, then it is branched to an alternative process. This process can represent a further try of the original process or can run to an error handling branch. Of course, also several tries, preferably in a loop, can be provided and the amount of tries can again be limited. All of these extensions have the aim to still increase the process stability and the error tolerance respectively.

Figure 6:
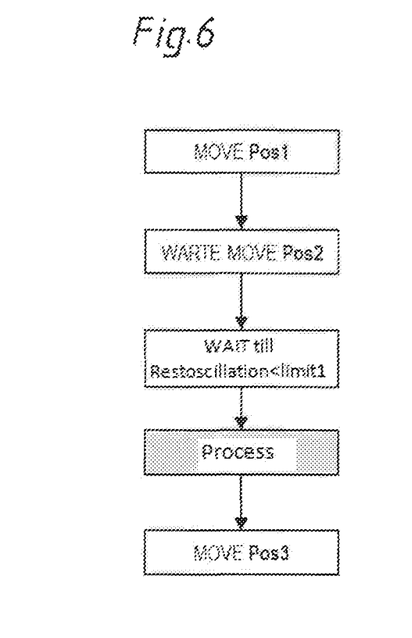
FIG. 6 shows exemplary program code according to the invention.
Figure 8:
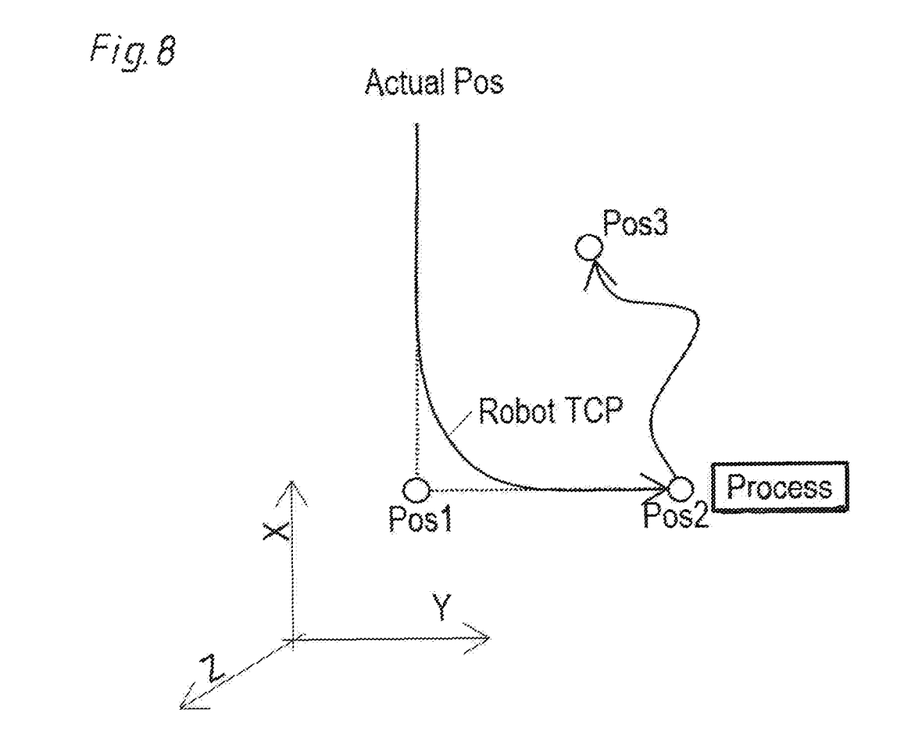
FIG. 8 shows the movement of the handling arm by means of a TCP.

FIG. 8 shows an idealized movement of the TCP (tool center point) without oscillation of the TCP in the case of a programming as shown in FIG. 6. Also the three movement axes X, Y and Z are shown.

Figures 9, 10:
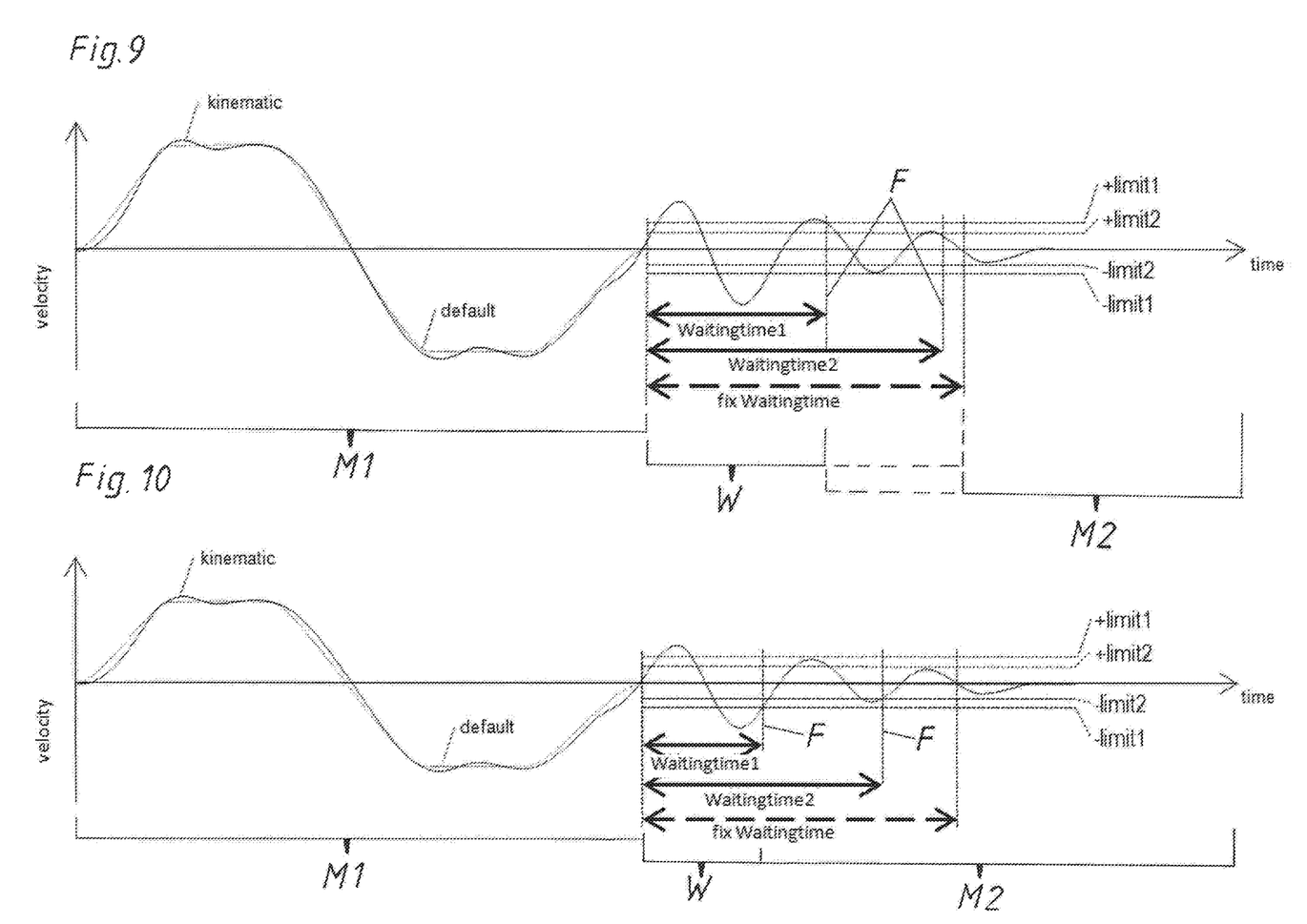
FIG. 9 shows a diagram of the velocity/time-progress of the acceleration of the end point and FIG. 10 shows a diagram of the velocity/time-progress of the acceleration of the end point in the case of a lower default velocity.

FIG. 9 shows in a diagram the time progress of the end point acceleration. For this purpose, an interface module on the handling arm 8 is extended by an acceleration sensor (sensor 16). This sensor 16 enables the direct or modeled detection of the acceleration of the end point (end-of-arm) and the evaluation of the signal in the control device 1. In the procedure sequence B the acceleration is stored relative to the time (see dashed line "default"). The acceleration actually measured by the sensor 16 deviates from this default (see the continuous line "kinematic"). This controlled movement of the handling arm 8 corresponds to the movement phase M1. The waiting phase W joins to this movement phase M1. Oscillations are occurring by the predetermined abrupt braking of the movement of the handling arm 8, which oscillations subside by themselves with the time or by a damping introduced into the drive system. In order to pass on to the subsequent handling phase M2, a fix waiting time has been predetermined up till now (see dashed arrow). In doing so, however, an unnecessary deceleration of the cycle time has been accepted. In contrary, threshold values G (limit1, limit2) are now predetermined, which threshold values G are directly referring to the actual real oscillation behavior. As soon as this threshold value G is reached or undershot, the continuation signal F is outputted and, thereby, the handling phase M2 is started. As now the outputting of the continuation signal F is depending on a measured or calculated oscillation behavior, the switching reduces the next phase of the movement progress significantly (see shorter waitingtime1 and waitingtime2 respectively).

If changing the robot acceleration default according to FIG. 10, for example during the start of a new product, or if setting changed threshold values, also the waiting times between the actual positioning of the robot and the possibility to start the subsequent process step change. The precise requirements are depending on each process, so that this process can be carried out with a swung out manipulator. According to FIG. 10, the maximal acceleration of the default is smaller than in FIG. 9, whereof the lower oscillation amplitudes result. For this reason, a still higher time saving compared to the predetermined waiting time is given in the case of the continuation signal outputting directly depending on the oscillation behavior.

LIST OF REFERENCE SIGNS 1 control device
2 handling device
3 storage medium
4 processing unit
5 output
6 input
7 end-of-arm
8 handling arm
8a-8c arm parts
8c1, 8c2 parts of the arm part 8c
9 comparison unit
10 calculating unit
11 molding machine
12 end-of-arm tool
13 molding part
14-14c drive devices
15 handling control system
16 sensor
17 molding unit
18 injection device
19 closing unit
20 molding tool
20a, 20b mold halves
21 machine control system
22 injection unit
23 feed hopper
24 injection channel
25 moveable mold mounting plate
26 fix mold mounting plate
27 drive device
28 frame
29 socket
30 carrier
31 suction elements
32 rods
G threshold value
$G_{dyn}$ threshold value on the basis of a dynamic parameter
$G_t$ threshold value on the basis of a time limit
F continuation signal
W waiting phase
$P_{dyn}$ dynamic parameter
$V_{dyn}$ curve of the dynamic parameter
B procedure sequence
X, Y, Z movement axis
M1 movement phase
M2 handling phase
M3 movement or transport phase
P1 starting position
P2 handling position
P3 end position
ABC rotary axis

The invention claimed is:

1. A control device for a handling device, the control device comprising:
 a non-transitory computer-readable medium having stored thereon executable instructions;
 a processor;
 an output configured to output signals; and
 an input configured to receive signals from the handling device,
 wherein:

the control device is configured to determine an end of a waiting phase when reaching a threshold value, the waiting phase being conducted before an actuation of an end-of-arm tool mounted to an end-of-arm of a handling arm of the handling device and the waiting phase serving to reduce oscillations of the end-of-arm of the handling arm of the handling device;

the signals received by the input represent a dynamic parameter of the end-of-arm of the handling arm of the handling device and the threshold value corresponds to a specific dynamic parameter of the end-of-arm of the handling arm of the handling device stored in the non-transitory computer-readable medium;

the executable instructions, when executed by the processor, cause the control device to function as a comparison unit configured to: (i) compare the signals received from the handling device with the threshold value and determine the end of the waiting phase when reaching the threshold value; or (ii) based on a curve of the dynamic parameter of each of multiple oscillating profiles of the end-of-arm of the handling arm of the handling device that are stored in the non-transitory computer-readable medium, determine the threshold value, which corresponds to a time limit, and determine the end of the waiting phase when reaching the threshold value; and the control device is configured to control the end-of-arm of the handling arm of the handling device based on the end of the waiting phase which has been determined.

2. The control device according to claim 1, wherein the control device is configured to output a continuation signal based on the end of the waiting phase which has been determined.

3. The control device according to claim 1, wherein the dynamic parameter is an oscillation value which is determined based on at least one of a speed, an acceleration, a deflection, a stress state or a position of the end-of-arm of the handling arm of the handling device.

4. A handling device for a molding machine, the handling device comprising:
a handling arm which comprises an end-of-arm;
an end-of-arm tool mounted to the handling arm for handling a molding part or a semi-finished product; and
at least one drive device for the handling arm,
wherein the handling arm comprises the control device according to claim 1.

5. The handling device according to claim 4, wherein the handling device comprises a handling control system, and the control device is signally connected to the handling control system or is integrated into the handling control system.

6. The handling device according to claim 4, wherein at least one procedure sequence for moving the end-of-arm along at least one movement axis is stored in the non-transitory computer-readable medium of the control device or in the handling control system.

7. The handling device according to claim 6, wherein the at least one procedure sequence comprises:
a period of movement for moving the end-of-arm from a starting position to a handling position;
the waiting phase;
a handling phase initiated by a continuation signal; and
a movement or transport phase for moving the end-of-arm from the handling position into an end position.

8. The handling device according to claim 6, wherein the at least one procedure sequence includes multiple procedure sequences, wherein the multiple procedure sequences differ from each other at least in speeds of the end-of-arm in a handling phase, and wherein for each procedure sequence, the threshold value is stored in the non-transitory computer-readable medium, the threshold value being dependent on an executed action of the end-of-arm tool of each handling phase.

9. The handling device according to claim 6, wherein, in each period of the at least one procedure sequence, the control device is configured to transmit corresponding signals via the output to the at least one drive device.

10. The handling device according to claim 4, further comprising at least one sensor, wherein the at least one sensor is configured to transmit values measured by the at least one sensor to the input of the control device as signals representing the dynamic parameter.

11. The handling device according to claim 10, wherein the at least one sensor is in an area of the end-of-arm or in an area of the end-of-arm tool.

12. The handling device according to claim 10, wherein the at least one sensor is an acceleration sensor.

13. A molding unit comprising:
a molding machine; and
the handling device according to claim 4.

14. The molding unit according to claim 13, wherein the molding machine comprises an injection device and a closing unit with a molding tool, wherein the handling device is configured to: (i) handle, in a handling phase, a molding part produced in the molding tool; or (ii) bring a semi-finished product into the molding tool.

15. The molding unit according to claim 13, wherein the molding machine comprises a machine control system, and a handling control system is signally connected to the machine control system or is integrated into the machine control system.

16. The molding unit according to claim 13, wherein the molding machine is an injection molding machine.

* * * * *